Sept. 2, 1958  L. G. HILL  2,849,904
DEVICE FOR SERRATING A SHAFT
Filed Sept. 23, 1955
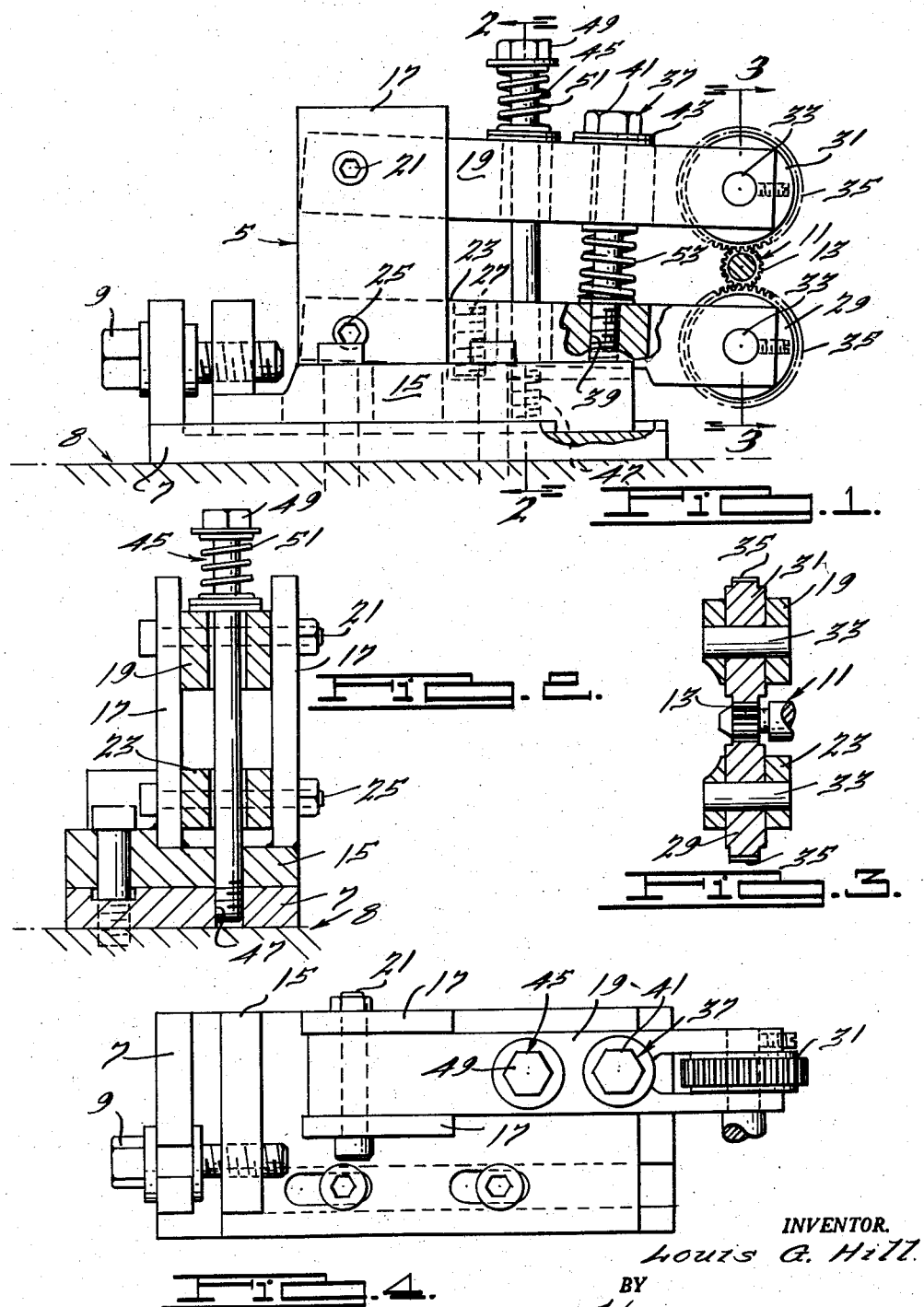
INVENTOR.
Louis G. Hill
BY
Harness, Dickey & Pierce
ATTORNEYS.

United States Patent Office 2,849,904
Patented Sept. 2, 1958

2,849,904

DEVICE FOR SERRATING A SHAFT

Louis G. Hill, Morenci, Mich.

Application September 23, 1955, Serial No. 536,161

1 Claim. (Cl. 80—16)

This invention relates generally to a device for forming splines or gear teeth on a workpiece, and more particularly to such a device mountable on a machine which performs other operations on the workpiece.

It is an object of this invention to provide a device of the aforementioned type which can be mounted on a cross slide of an automatic screw machine or the like for forming gear teeth on a workpiece on which other operations are being performed in the automatic screw machine so that the splines or gear teeth can be provided on the workpiece without requiring a special or separate operation.

It is a still further object of this invention to provide a device of the aforementioned type which may be moved into engagement with a workpiece easily and rapidly to form gear teeth thereon.

It is a still further object of this invention to provide a device of the aforementioned type which may be adjusted to form gear teeth on workpieces of different sizes and made of different materials.

It is a still further object of this invention to provide a device of the aforementioned type which is relatively inexpensive to manufacture and durable in operation.

These and other objects of this invention will become apparent from the following description taken in conjunction with the accompanying drawing, in which:

Figure 1 is a side elevational view of a device of this invention mounted on a cross slide of a machine, such as an automatic screw machine, and forming gear teeth on a workpiece;

Fig. 2 is a sectional view of the structure illustrated in Figure 1, taken along the line 2—2 thereof;

Fig. 3 is a sectional view of the structure illustrated in Figure 1, taken along the line 3—3 thereof; and Fig. 4 is a top plan view of the structure illustrated in Figure 1.

Referring now to the drawing, it will be seen that the device of this invention, which is generally indicated at 5, is mounted on a cross slide 7 of a machine 8, such as an automatic screw machine. The device 5 may be fed or moved relative to the cross slide 7 by means of a feed screw 9 so as to move the device into and out of engagement with a workpiece 11 which is rotatably driven and supported by the machine 8. The workpiece 11 may be of any suitable type, but is illustrated as being an automobile window regulator shaft which is generally cylindrical in shape and on the outer periphery of at least one portion thereof it is desired to form splines or gear teeth 13.

The device 5 includes a base portion 15 having upstanding spaced apart rigid legs 17. An upper bifurcated arm member 19 is pivotally connected with the legs 17 at 21, while a lower bifurcated arm member 23 is pivotally connected with the legs 17 at 25. A setscrew 27 is threadably connected with the lower arm 23 and engages a surface of the base 15 to position the arm in a predetermined position relative to the base and prevent downward movement of the arm relative to the base. Rollers 29 and 31 are pivotally supported on the lower and upper arms 23 and 19, respectively, by any suitable means, such as shafts 33. The rollers 29 and 31 are provided with gear-like forming teeth 35 on the outer periphery thereof. The number of teeth on each of the rollers 31 and 29 must be divisible by the number of gear teeth 13 to be formed on the workpiece 11. An elongated stud 37 has its lower end threadably connected at 39 to the lower arm 23, while its upper end extends through the upper arm 19 so that the head 41 of the stud abuts the top of the arm either directly or through washers 43. The stud 37 limits the movement of the upper arm upwardly, or away from the lower arm 23, and thus limits the distance the rollers 29 and 31 can move apart relative to each other. A second stud 45 extends through the upper and lower arms 19 and 23 and is threadably connected with the base 15 at 47. The stud 45 has a head 49 on the upper end thereof and a coil spring 51 is disposed between the head 49 and the top of the arm 19. Suitable washers may be provided at the top and bottom of the spring, as illustrated. The spring 51 resiliently urges the arm 19 downwardly toward the arm 23 so as to move the rollers 29 and 31 closer together. A coil spring 53 is sleeved on the stud 37 between the upper and lower arms tending to resiliently urge the upper arm into engagement with the head 41 on the stud 37 and urging the lower arm downwardly so as to maintain the setscrew 27 in engagement with the base 16. The force exerted by the spring 51 is greater than the force exerted by the spring 53 so that the upper surface of the arm 19 will normally be disposed below the underside of the head 41 on the stud 37, thus resiliently loading the upper arm but permitting the arm 19 to move upwardly until its movement is stopped by engagement with the head 47 on the stud 37.

The workpiece 11 is rotatably supported in a machine, such as an automatic screw machine, so that it is being rotatably driven, whereby various machine operations may be made on the same. While these operations are being made, the device 5 may be fed into engagement with the workpiece to form the splines or gear teeth on the outer periphery of a cylindrical portion thereof. As the rollers 29 and 31 are fed into engagement with the workpiece 11, they will be under spring tension because of the coil spring 51. As the movement of the rollers 29 and 31 transversely of the longitudinal or rotative axis of the workpiece continues, the outer periphery of the workpiece will force the rollers apart until no further movement is possible because of the limit provided by the head 41 of the stud 37. The rollers will then be spaced apart the desired distance to roll form the gear teeth or splines 13 on the outer periphery of the cylindrical portion of the workpiece 11 and to the desired depth. After the rollers 29 and 31 have been fed in past the center of the workpiece, they will be moved outwardly again, and the gear teeth will be formed on the workpiece.

It can thus be appreciated that the rollers are under spring tension during their initial engagement with the workpiece and that they cannot move apart any further than determined by the position of the head 41 of the stud 37. It will, furthermore, be appreciated that by adjusting the position of the stud 37 relative to the bottom arm 23, the distance between the rollers can be varied to accommodate different sized workpieces. It will, furthermore, be appreciated that the tension exerted by the spring 51 can be easily varied to control the operation so as to form the gear teeth on the workpiece in the desired manner. Thus, with the device mounted on a machine, such as an automatic screw machine, the splines or gear teeth can be formed on the workpiece while other operations are being performed thereon and without requiring a special or separate operation.

What is claimed is:

A device for forming gear teeth on the periphery of a cylindrical portion of a workpiece rotatably driven and supported on a machine, including a base, a pair of elongated arm members pivotally connected adjacent one end with said base and extending in a generally parallel direction, one of said arm members being movable relative to the other of said arm members, roller means rotatably supported adjacent the free ends of each of said arm members, said roller means having gear teeth on the outer periphery thereof for engaging the cylindrical portion of the workpiece and roll forming gear teeth thereon, a stud-like member extending through said arm members at generally right angles thereto and connected to said base for adjustable in and out movement, spring means connected between said stud-like member and one of said arm members urging said one arm member toward the other one of said arm members and toward said base, a second stud-like member extending generally parallel to said first stud-like member and adjustably connected to said other arm member and having means engageable with said one arm member to limit the movement of said arm members away from each other so that said rollers will be spring loaded when engaging the workpiece and so that said rollers can move apart only a desired distance to properly form the gear teeth on the cylindrical portion of the workpiece, said second stud-like member being spaced farther from the pivoted ends of said arms than from the free ends thereof, and second spring means urging said arm members away from each other and said other arm member toward said base, said second spring means exerting a lesser force than said first spring means.

References Cited in the file of this patent

UNITED STATES PATENTS

| 2,654,273 | Jones | Oct. 6, 1953 |
| 2,654,275 | Jones | Oct. 6, 1953 |
| 2,654,276 | Jones | Oct. 6, 1953 |

FOREIGN PATENTS

| 83,340 | Switzerland | Apr. 16, 1920 |
| 517,039 | France | Apr. 29, 1921 |
| 611,350 | Great Britain | Oct. 28, 1948 |

OTHER REFERENCES

Machine Tools and Their Operation (New York—McGraw Hill Book Co.), 1922 Ed., Part I, Chapter 15, pages 274–277.